(No Model.)

L. W. BUXTON.
COFFEE FILTER.

No. 369,838. Patented Sept. 13, 1887.

Witnesses:
Rob H W. Matthews
E. L. Sawyer.

Inventor:
Levi W. Buxton,
per C. A. Shaw & Co
Att'ys.

UNITED STATES PATENT OFFICE.

LEVI W. BUXTON, OF NASHUA, NEW HAMPSHIRE, ASSIGNOR OF TWO-THIRDS TO CHARLES H. LINDSEY AND GEORGE E. SMALL, BOTH OF SAME PLACE.

COFFEE-FILTER.

SPECIFICATION forming part of Letters Patent No. 369,838, dated September 13, 1887.

Application filed April 16, 1887. Serial No. 235,023. (No model.)

*To all whom it may concern:*

Be it known that I, LEVI W. BUXTON, of Nashua, in the county of Hillsborough, State of New Hampshire, have invented a certain new and useful Improvement in Coffee-Filters, of which the following is a description sufficiently full, clear, and exact to enable any person skilled in the art to which said invention appertains to make and use the same, reference being had to the accompanying drawings, forming part of this specification, in which—

Figure 1:
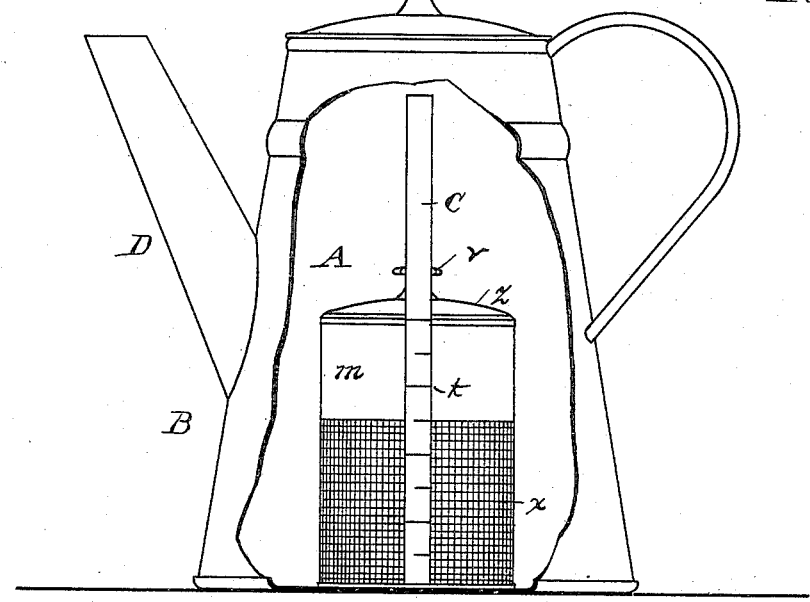
Figure 2:
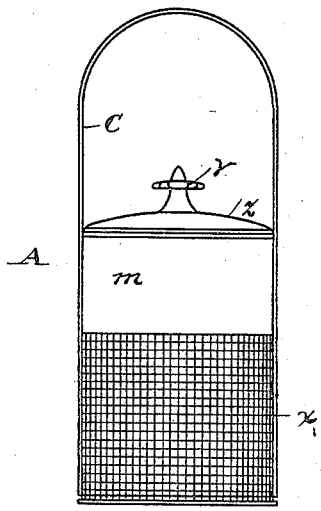

Figure 1 is a side elevation of my improved filter, represented in position for use in a coffee-pot, the side of the pot being shown as broken away; and Fig 2, a front elevation of the filter detached.

Like letters of reference indicate corresponding parts in the different figures of the drawings.

My improvement relates more especially to that class of filters for coffee which are detachable from the pot; and it consists in a novel construction and arrangement of parts, as hereinafter more fully set forth and claimed, the object being to produce a simpler, cheaper, and more effective article of this character than is now in ordinary use.

It is sometimes the custom in preparing coffee for drinking purposes to inclose it in a cloth sack or filter and place it in the pot before it is filled with hot water. This method is objectionable from the fact that it is difficult to remove the cloth containing the grounds after the coffee is sufficiently leached, and if it is allowed to remain the liquid gradually becomes thick and bitter, rendering it disagreeable as a beverage.

My improvement is designed to overcome these and other objections, and to that end I make use of means which will be readily understood by all conversant with such matters from the following explanation.

In the drawings, A represents the body of the filter, and B the coffee-pot. The body of the filter consists of a cylindrical receptacle or holder, the sides of which for about two-thirds of its height from the bottom are composed of fine wire-cloth, as shown at $x$, and the upper portion, $m$, of tin or similar material, its top being closed by a tight-fitting cover, $z$, provided with a knob or handle, $v$.

The bail or handle C consists of an inverted-U-shaped piece of sheet metal, and is extended to the bottom of the holder, being soldered securely on each side thereof, and of such length that it can be conveniently reached when the holder is in use in the pot.

The bail C is provided with a scale, $t$, as shown in Fig. 1, its purpose being to enable the person using the filter to accurately measure the amount of tea or coffee necessary for a given number of consumers. I do not confine myself, however, to the use of the scale, as it may be omitted, if desired.

It will be readily seen that my improvement obviates the necessity of using the screen or filter ordinarily inserted at the inlet of the nose D.

In the use of my improvement the requisite amount of tea or coffee, as indicated by the scale $t$, is placed in the filter A and the filter inserted in the pot B. Water is then poured into the pot in the usual manner, and when the coffee is sufficiently leached the holder is removed.

The liquid tea or coffee made in the above manner may be kept in a heated condition for an indefinite time without becoming dark-colored or bitter.

It will be understood that when the pot B is filled with water it immediately passes through the screen $x$ into the coffee, thereby thoroughly leaching it and keeping the liquid clear or free from grounds.

It will be obvious that my improved filter is equally well adapted for making tea, and I do not, therefore, confine myself to using it for coffee only.

Having thus explained my invention, what I claim is—

A coffee-filter the body of which is composed of sheet metal and wire-gauze and provided with a bail comprising a sheet-metal strip which extends down said body outside the wire-gauze, said strip being provided with a graduated scale for determining the quantity of coffee placed in the reticulated filter, substantially as described.

LEVI W. BUXTON.

Witnesses:
B. B. WHITTEMORE,
ELMER H. WHITE.